US006892765B2

(12) United States Patent
Kamimura

(10) Patent No.: US 6,892,765 B2
(45) Date of Patent: May 17, 2005

(54) ACCUMULATOR

(75) Inventor: Shinya Kamimura, Shizuoka (JP)

(73) Assignee: NOK Corporation, Tokyo (JP)

(*) Notice: Subject to any disclaimer, the term of this patent is extended or adjusted under 35 U.S.C. 154(b) by 0 days.

(21) Appl. No.: 10/312,642

(22) PCT Filed: Jul. 2, 2001

(86) PCT No.: PCT/IB01/01170

§ 371 (c)(1),
(2), (4) Date: Jun. 27, 2003

(87) PCT Pub. No.: WO02/01077

PCT Pub. Date: Jan. 3, 2002

(65) Prior Publication Data

US 2004/0003854 A1 Jan. 8, 2004

(30) Foreign Application Priority Data

Jun. 30, 2002 (JP) ........................................ 2000-198102

(51) Int. Cl.$^{7}$ ................................................. F16L 55/04
(52) U.S. Cl. ............................................ 138/30; 138/31
(58) Field of Search ...................................... 138/30, 31

(56) References Cited

U.S. PATENT DOCUMENTS 3,714,964 A * 2/1973 Livingston ............... 137/513.3
4,527,580 A * 7/1985 Chheda .......................... 137/1
4,997,009 A * 3/1991 Niikura et al. ................ 138/30
5,098,263 A * 3/1992 Hattori et al. .............. 417/540
5,797,430 A * 8/1998 Becke et al. .................. 138/30
6,286,552 B1 * 9/2001 Shimbori et al. ............. 138/31
6,494,545 B2 * 12/2002 Nakamura et al. ............ 303/87
6,502,828 B1 * 1/2003 Sasaki ........................ 277/590
6,644,354 B2 * 11/2003 Dinkel et al. ................. 138/30
2003/0116209 A1 * 6/2003 Umetsu et al. ............... 138/31
2003/0178076 A1 * 9/2003 Suzuki et al. ................. 138/30

FOREIGN PATENT DOCUMENTS

| | | |
|---|---|---|
| JP | 02-065701 | 5/1990 |
| JP | 09-242702 | 9/1997 |
| JP | 11-006572 | 1/1999 |

* cited by examiner

*Primary Examiner*—James Hook
(74) *Attorney, Agent, or Firm*—Ohlandt, Greeley, Ruggiero & Perle, L.L.P.

(57) ABSTRACT

An accumulator with a bellows dividing the accumulator into a pressure sealing chamber and a fluid flow-in chamber. A fluid inlet introduces fluid into the flow-in chamber. A bellows cap is attached to a movable end of the bellows and contains a throttling mechanism and chamber room for dampening sounds generated by pulsating waves. The throttling mechanism is positioned to oppose the fluid inlet.

3 Claims, 3 Drawing Sheets

Prior Art

ACCUMULATOR

BACKGROUND OF THE INVENTION

The present invention relates to an accumulator used as a pressure accumulating apparatus, a pulse pressure absorbing apparatus or the like.

Conventionally, an accumulator shown in FIG. 3 has been well known and constructed as follows.

First, a housing 52 is provided by welding end covers 54, 55 to both end portions of a cylindrical shell 53. Inside this housing 52, an operating member 56 comprising a bellows 57 and a bellows cap 58 is accommodated. An end portion of the bellows 57 is attached to the one end cover 54 while the bellows cap 58 is mounted on the other end portion thereof. Consequently, the interior of the housing 52 is divided to a pressure sealing chamber 59 inside the bellows 57 and the bellows cap 58 aid an outside fluid flowin chamber 60 by the bellows 57 and the bellows cap 58.

The end cover 54 on the one left side in this Figure is provided with a pressure supply port 61 for supplying gas into the pressure sealing chamber 59. In this pressure support 61, a plug member 62 for clogging this supply port 61 is fitted in. Thus, after removing this plug member 62, gas under a predetermined pressure is supplied into the sealing chamber 59 from the supply port 61. After supplying, the supply port 61 is clogged with the plug member 62 so as to fill the pressure sealing chamber 59 with gas under the predetermined pressure.

The other end cover 55 on the right side of the same Figure has a mounting portion 63 having a thread portion 64 for connecting the accumulator 51 to a fluid pipe on a system side (not shown). This mounting portion 63 contains a fluid inlet 65 for introducing fluid on the system side into the fluid flow-in chamber 60. Therefore, the actuator 51 is connected to the system side through the mounting portion 63 so as to introduce fluid on the system side into the fluid flow-in chamber 60 through the fluid inlet 65.

The accumulator 51 having the above-described structure accumulates the pressure of oil in a system and discharges the oil as a pressure accumulating apparatus. However, when the pressure of oil is accumulated or discharged, pulsating waves occur and thereby some (abnormal) sound has been generated. =p In views of the above problem, an object of the present invention is to provide an accumulator capable of damping the sound due to the pulsating wave.

BRIEF SUMMARY OF THE INVENTION

To achieve the abovedescribed object, the accumulator according to claim 1 of the present invention has such a feature that an operating member containing a bellows is disposed inside a housing so as to divide the interior of the housing to a pressure sealing chamber and a fluid flow-in chamber and the housing is provided with a fluid inlet for introducing fluid to the fluid flow-in chamber from the side of a fluid pipe, the accumulator further comprising a throttling mechanism and a chamber room for damping a sound generated by the pulsating wave, provided at a movable end portion of the operating member.

According to claim 2 of the present invention, there is provided the accumulator according to claim 1 wherein the operating member has a bellows cap, which is attached to the movable end portion of the bellows, and the bellows cap contains the throttling mechanism and the chamber room.

According to claim 3 of the present invention, theris provided the accumulator according to claim 1 or 2 wherein the throttling mechanism is provided at a position opposing the fluid inlet.

If fluid with pulsation flows into the accumulator of claim 1 of the present invention having the above-described structure, pulsation energy is converted to loss energy due to contracted flow and throttling by the throttling mechanism. Further, the fluid with pulsation is used as loss of dynamic pressure by provision of the chamber room. Consequently, the pulsation can be damped, so that a sound caused by the pulsating wave can be damped.

The bellows is made of, for example, a metallic bellows and the metallic bellows often has the bellows cap at its movable end portion. Therefore, in case where the bellows of the operating member of the present invention is a metallic bellows and the bellows cap is attached to its movable end portion, preferably, the throttling mechanism and the chamber room are provided on the bellows cap (claim 2). Further, preferably, the throttling mechanism is provided at a position opposing the fluid inlet (claim 3).

DETAILED DESCRIPTION OF THE INVENTION

Figure 1:
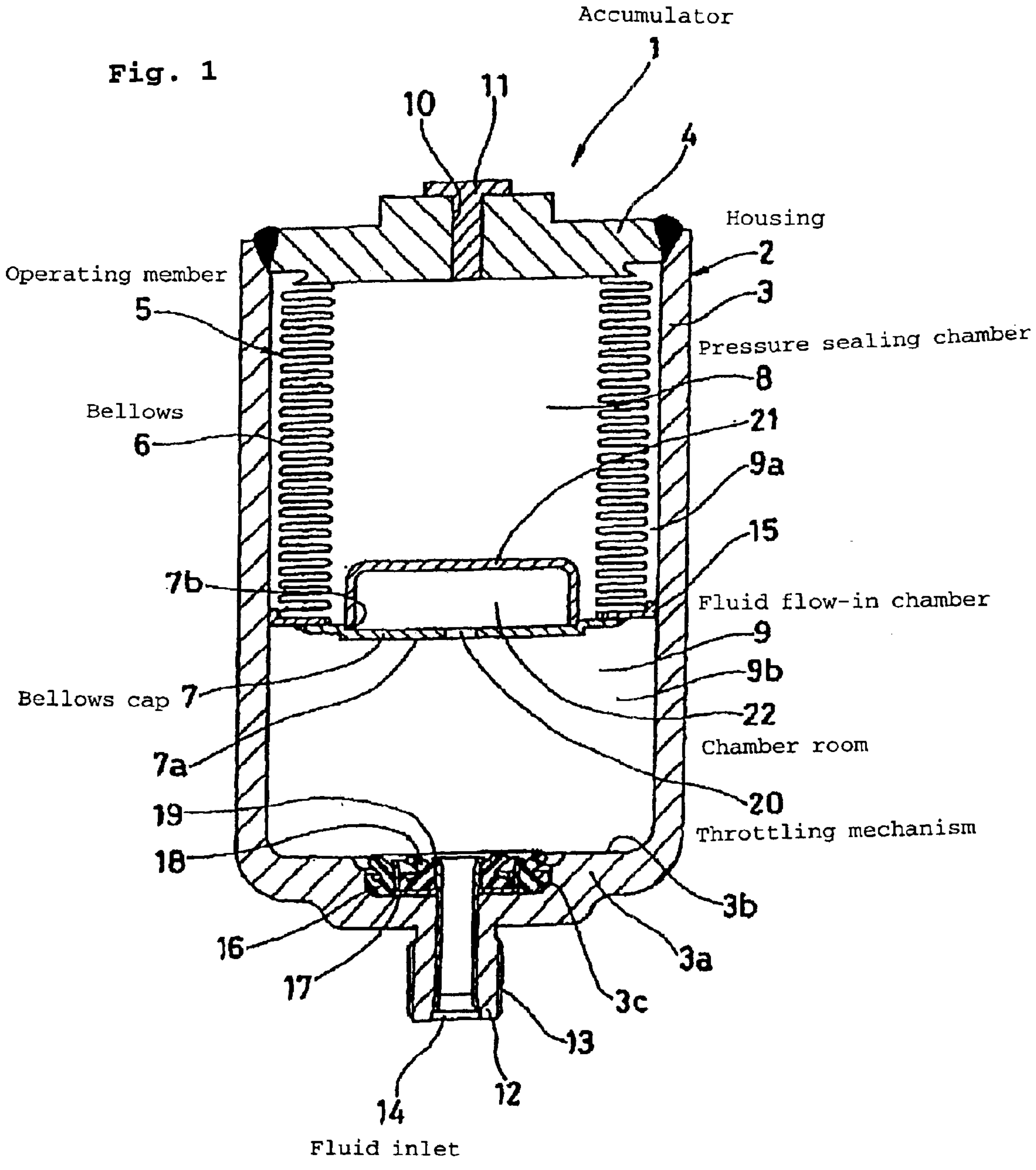
FIG. 1 is a sectional view of an accumulator according to the embodiment of the present invention.

The accumulator 1 of this embodiment is a metallic bellows type accumulator, which has the following structure.

First, a housing 2 is provided by welding an end cover 4 (called gas end cover or lid member also) to an open end portion of a bottomed cylindrical shell 3 and an operating member 5 comprising a bellows and a bellows cap (called end member also) is accommodated inside this housing 2. An end portion (called fixed end portion also) of the bellows 6 is attached to the end cover 4 while the other end portion (called movable end portion) has a bellows cap 7. Consequently, the interior of the housing 2 is divided to a pressure sealing chamber (called gas chamber) 8 inside the bellows 6 and the bellows cap 7 and an outside fluid flow-in chamber (called liquid chamber or fluid chamber also) 9 by the bellows 6 and the bellows cap 7. Although such a metallic bellows as an electrodeposited bellows, formed bellows, welded bellows is used as the bellows 7, it is permissible to use other material bellows depending on the specification or purpose of the accumulator 1. Further, the bellows cap 7 may be formed integrally with the bellows 6.

The end cover 4 which forms part of the aforementioned housing 2 is provided with a pressure supply port 10 for supplying gas into the pressure sealing chamber 8. This pressure supply port 10 has a plug member (called gas plug also) 11 for clogging this supply port 10. Thus, after removing this plug member 11, gas under a predetermined pressure is supplied into the sealing chamber 8 through the supply port 10. After supplying the supply port 10 is clogged with the plug member 11 so as to fill the sealing chamber 8 with gas under the predetermined pressure. As the kind of gas to be filled, preferably, nitrogen gas or inert gas is used. A mounting portion 12 having a thread portion 13 for connecting the accumulator 1 to a pressure pipe on a hydraulic pressure system (not shown) is provided in the center of a flat face of a wall end portion 3*a* which forms part of the housing 2. This mounting portion 12 has a fluid inlet (called fluid introduction port or fluid passage) 14 for introducing fluid on the syssede into the fluid flow-in chamber 9. Thus, the accumulator 1 is connected to the system side through the mounting portion 12 so as to introduce fluid on the system side into the fluid flow in chamber 9 through the fluid inlet 14.

A ring-like sliding member (called vibration damping ring also) 15 is mounted on an outer periphery of the other end portion of the bellows 6 provided with the bellows cap 7 or the outer periphery of the bellows cap 7. When the bellows cap 7 is moved while the bellow 6 is expanded or contracted, the sliding member 15 slides along an inner peripheral face of the shell 3 at the outer periphery thereof. Thus, the bellows cap 7 moves in parallel to the inner peripheral face of the shell 3 while the bellows 6 is expanded or contracted in parallel to the inner peripheral face of the shell 3 under a guide by the sliding of the sliding member 15. Consequently, the bellows cap 7 or the bellows 6 is prevented from being caught by the inner peripheral face of the shell 3. In the meantime, a pressure communicating portion (not shown) is provided in this sliding member 15 in order to prevent the fluid flow-in chamber 9 from being divided to a space 9*a* on the outer periphery side of the bellows 6 and a space 9*b* below the bellows cap 7 in the same Figure by the sliding member 15.

A concave or stepped mounting portion 3*c* is provided in the inner face of the wall end portion 3*a* of the shell 3, that is, in the peripheral portion of the opening of the supply port 10 of an end face portion 3*b* of the shell 3. An outside seal 16, an outside holder 17, an inside seal 18 and an inside holder 19 are mounted in this mounting portion 3*c* successively from the outer periphery.

The outside seal 16 is provided so as to maintain the pressure of the fluid flow in chamber 9 over a predetermined value and keep the bellows 6 from being damaged. If the pressure of fluid in the fluid flowin chamber 9 or the pressure of fluid on the system side drops remarkably upon usage of the accumulator 1, the bellows 6 is prohibited from being expanded by a difference in pressure between the inside and the outside thereof. This outside seal is formed in the following structure.

Figure 2:
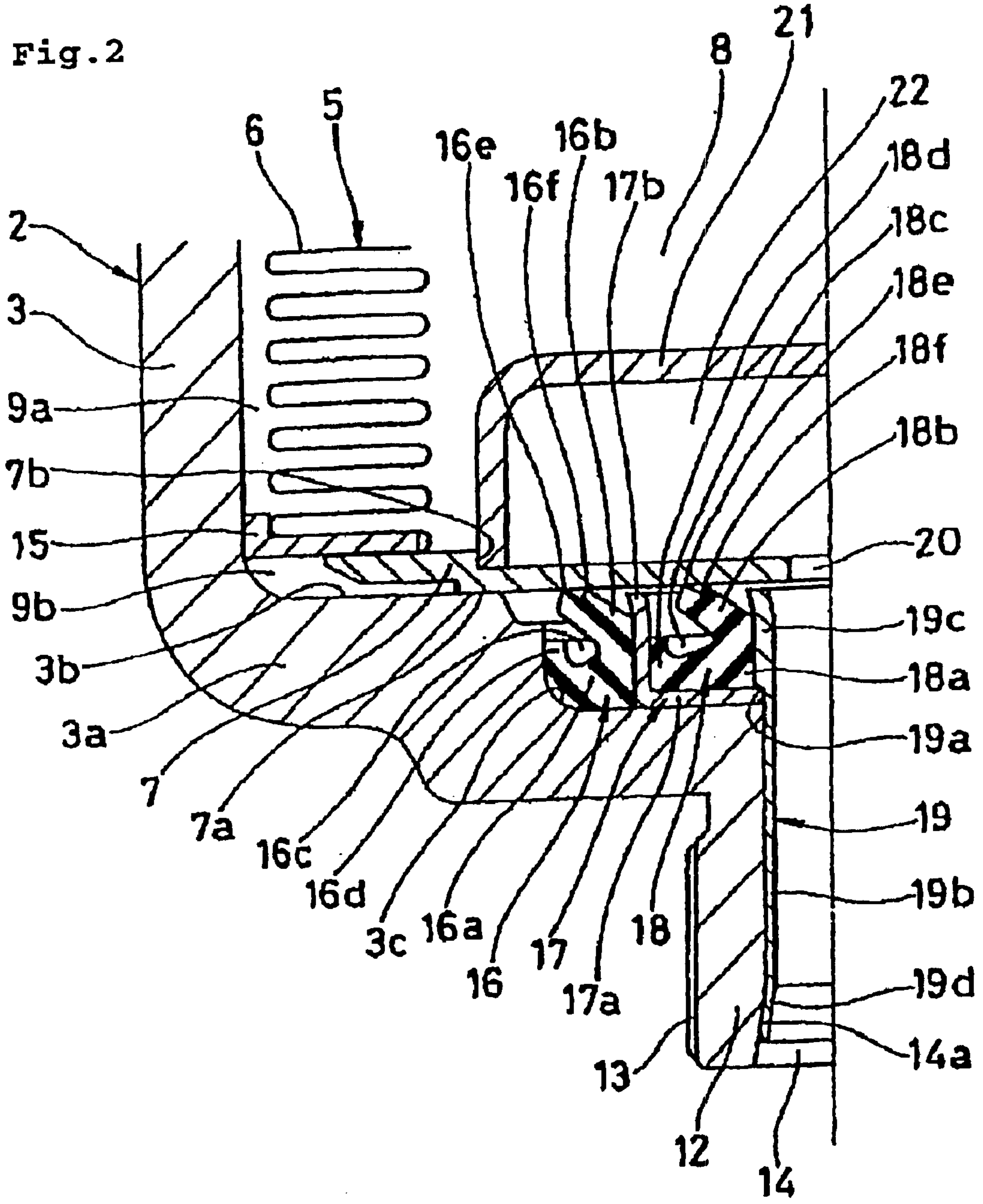
FIG. 2 is a partially enlarged sectional view showing the operating condition of the accumulator of FIG. 1.
Figure 3:
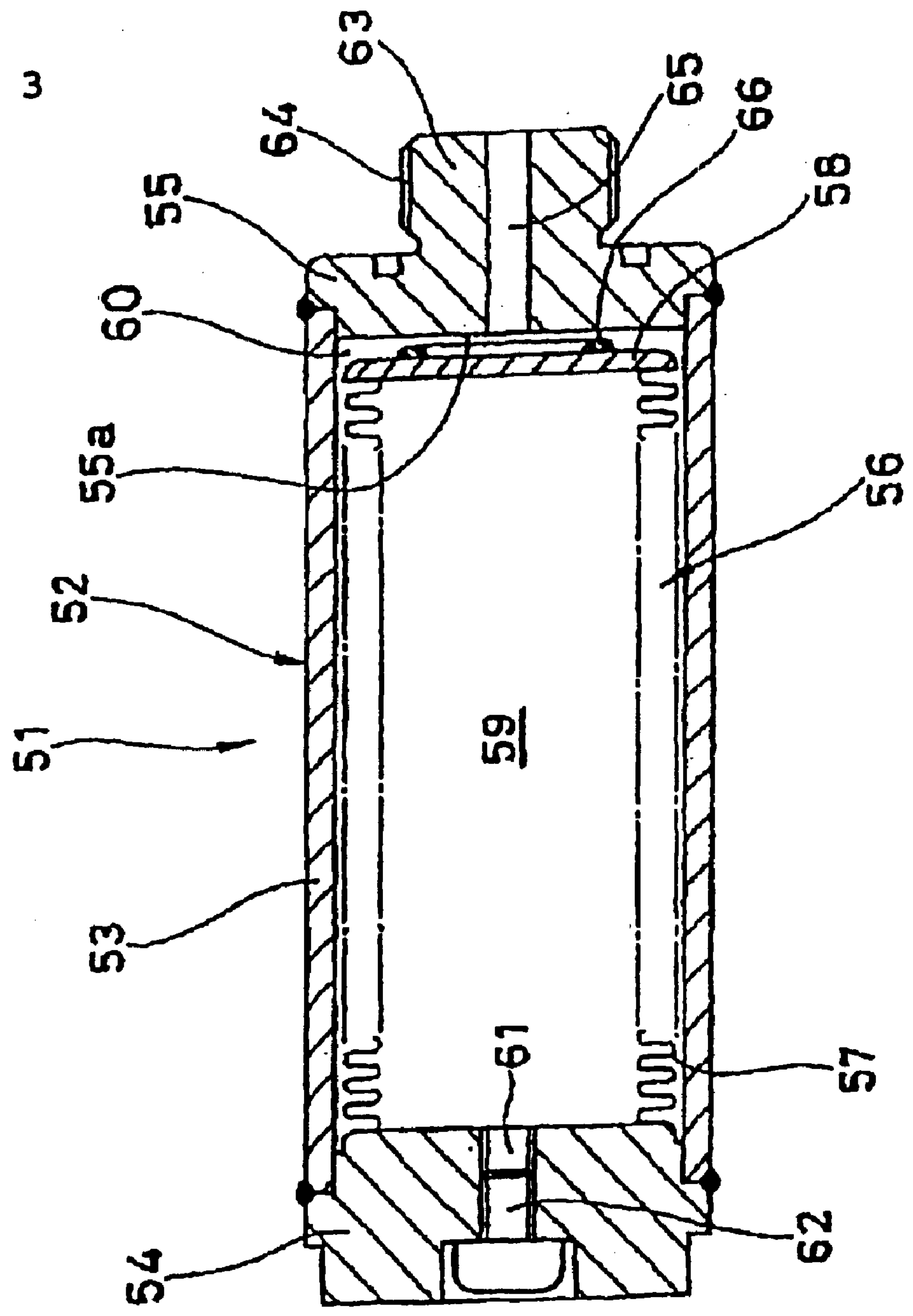
FIG. 3 is a sectional view of an accumulator according to a conventional example.

That is, this seal 16 is formed as a lip seal moulded of a predetermined rubber-like elastic material and as shown with an enlarged diagram of FIG. 2. The seal 16 has an annular base portion 16*a,* which is to be pressed into the mounting portion 3*c* without being bonded thereto. An annular seal lip (called inner peripheral seal lip or first seal lip) is formed integrally on an end face on the side of the bellows cap of the base portion 16*a* such that it makes contact with the end face 7*a* of the bellows cap 7 freely detachably. An annular concave portion 16*c* is formed on the outer peripheral side of the seal lip 16*b* and an outer peripheral side seal lip (called second seal lip also) 16*d* is formed integrally on a further outer side of this concave portion 16*c* such that it is always in a firm contact with the inner face of the mounting portion 3*c*.

As shown in the same Figure, the seal lip 16*b* is formed as an outward directed seal lip whose diameter is expanded outward in the diameter direction from a proximal portion to a distal portion thereof. When this seal lip 16*b* makes contact with the end face 7*a* of the bellows cap 7, it is pressed by a pressure within the fluid flow-in chamber 9, which is a resistant pressure of sealed fluid, against the end face 7*a* so that it makes a firm contact therewith. Therefore, an outer peripheral face of this seal lip 16 serves as a pressure receiving face. Two annular rows of sealing protrusions 16*e,* 16*f* are provided coaxially at a front end portion of the seal lip 16*b* and these seal protrusions 16*e,* 16*f* make contact with the end face 7*a* of the bellows cap 7.

Consequently, even if a foreign substance in fluid is caught between any one of the sealing protrusions 16*e,* 16*f* and the end face 7*a* of the bellows cap 7 so that the sealing performance between the sealing protrusion 16*e* or 16*f* and the end face 7*a* is lost, the other sealing protrusion 16*e* or 16*f* keeps a firm contact with the end face 7*a* throughout the entire circumference so as to maintain the sealing performance. Because such double structure of the sealing protrusions 16*e,* 16*f* is provided, the sealing performance of the entire seal lip 16*b* is improved. The number of the rows formed for the sealing protrusions 16*e,* 16*f* is not restricted to two rows, but may be three or more. When the bellows cap 7 is, after moved, stopped by the end face 3*b* of the shell 3 or other stoppers (not shown), the sealing protrusions 16*e,* 16*f* make contact with the end face 7*a* of the bellows cap 7. Thus, the seal lip 16*b* does not bear the operation or burden as a stopper which stops the bellows cap 7 moving toward it.

The outside holder 17 disposed on the inner peripheral side of the outside seal 16 is formed in an annular shape of rigid material such as metal or resin, and is comprised of a flat portion 17*a,* which is flat and annular or double-ring like, and a cylindrical rising portion 17*b,* which is formed integrally with this flat portion 17*a* such that it rises from the outer peripheral end portion of the flat portion 17*a* toward the bellows cap 7, its section being L-shaped or substantially L-shaped.

The inner peripheral end portion of the flat portion 17*a* is engaged with an annular stepped engaging portion 19*a* provided in the outer peripheral face of the inside holder 19. Therefore, when the inside holder 19 is inserted into the fluid inlet 14 and fixed therein, the outside holder 17 gets fixed to the shell 3. The rising portion 17*b* is disposed just on the inner peripheral side of the outside seal 16 and a front end portion thereof is expanded in a trumpet-like or tapered form, so that the rising portion 17*b* holds the outside seal 16 from being removed from the mounting portion 3*c*. This rising portion 17*b* has also the function of backing up the seal lip 16*b* of the outside seal 16. When the bellows cap 7 comes into contact with the end face 3*b* of the shell 3 or other stoppers and is stopped after the bellows cap 7 moves toward it so that a gap is generated between the rising portion 17*b* and the end face 7*a* of the bellows-cap 7. Thus, the rising portion 17*b* is always prohibited from being in contact with the bellows cap 7.

Like the outside seal 16, the inside seal 18, which is disposed on the inner peripheral side of the holder 17 and held by this holder 17, is provided so as to maintain the pressure of the fluid flow-in chamber 9 over a predetermined value and keep the bellows 6 from being damaged, so that if the pressure of fluid in the fluid flow-in chamber 9 or the pressure of fluid on the system side drops remarkably upon usage of the accumulator 1, the bellows 6 is prohibited from being expanded by a difference in pressure between the inside and the outside thereof. This inside seal is formed in a following structure.

That is, this seal 18 is formed as a lip seal moulded of a predetermined rubber-like elastic material and as shown in the enlarged diagram of FIG. 2. The seal 18 has an annular base portion 18*a,* which is to be pressed into the inner peripheral side of the outside holder 17 without being bonded thereto. An annular seal lip (called inner peripheral seal lip or first seal lip) 18*b* is formed integrally on an end face on the side of the bellows cap 7 of the base portion 18*a* such that it makes contact with the end face 7*a* of the bellows cap 7 freely detachably. An annular concave portion 18*c* is formed on the outer peripheral side of the seal lip 18*b* and an outer peripheral side seal lip (called second seal lip also) 18*d* is formed integrally on a further outer side of this concave portion 18*c* such that it is always in a firm contact with the inner face of the outside holder 17.

As shown in the same Figure, the seal lip 18*b* is formed as an outward directed seal lip whose diameter is expanded outward in the diameter direction from a proximal portion to a distal portion thereof. When this seal lip 18*b* makes contact with the end face 7*a* of the bellows cap 7, it is pressed by a pressure within the fluid flow-in chamber 9, which is a resistant pressure of sealed fluid, against the end face 7*a* so that it makes a firm contact therewith. Therefore, an outer peripheral face of this seal lip 18*b* serves as a pressure receiving face. Two annular rows of sealing protrusions 18*e,* 18*f* are provided coaxially at a front end portion of the seal lip 18*b* and these seal protrusions 18*e,* 18*f* make contact with the end face 7*a* of the bellows cap 7.

Consequently, even if a foreign substance in fluid is caught between any one of the sealing protrusions 18*e,* 18*f* and the end face 7*a* of the bellows cap 7 so that sealing performance between the sealing protrusion 18*e* or 18*f* and the end face 7*a* is lost, the other sealing protrusion 18*e* or 18*f* keeps a firm contact with the end face 7*a* throughout the entire circumference so as to maintain the sealing performance. Because such double structure of the sealing protrusions 18*e,* 18*f* is provided, the sealing performance of the entire seal lip 18*b* is improved. The number of the rows formed for the sealing protrusions 18*e,* 18*f* is not restricted to two rows, but may be three or more. When the bellows cap 7 is, after moved, stopped by the end face 3*b* of the shell 3 or other stoppers (not shown) the sealing protrusions 18*e,* 18*f* make contact with the end face 7*a* of the bellows cap 7. Thus, the seal lip 18*b* does not bear the operation or burden as a stopper which stops the bellows cap 7 moving toward it.

The inside holder 19 disposed on the inner peripheral side of the outside holder 17 and the inside seal 18 is formed in a cylindrical or pipe-like form of such rigid material as metal or resin, and is comprised of an insertion portion 19*b* having a relatively small diameter and to be inserted into the fluid inlet 14 and a rising portion 19*c* formed integrally with this insertion portion 19*b* and having a relatively large diameter. The aforementioned annular stepped engaging portion 19*a* is provided on the border between this insertion portion 19*b* and the rising portion 19*c*.

Although the insertion portion 19*b* is fixed to the shell 3 after it is pressed into the fluid inlet 14, it is permissible to expand the front end portion (bottom portion in the same Figure) of the insertion portion 19*b* in a trumpet-like or tapered form after the insertion portion 18*b* is inserted into the fluid inlet 14 so that it is fixed to the shell 3. In this case, part of the inner face of the fluid inlet 14 is provided with a trumpet-like or tapered engaging portion 14*a* preliminarily.

As shown in FIG. 2, where the bellows cap 7 comes into contact with the end face 3*b* of the shell 3 or other stoppers, a gap is generated between the bellows cap 7 and the end face 7*a* of the bellows cap 7. Thus, the rising portion 19*c* is always prohibited from being in contact with the bellows cap 7.

Further, the accumulator 1 of this embodiment contains an abnormal sound preventing mechanism having the following structure.

As shown in FIG. 1 and FIG. 2, the bellows cap 7 mounted on the movable end portion of the bellows 6, which is the operating member 5, is provided with a through hole-like throttling mechanism 20 damping a sound generated by pulsating waves and having a relatively small diameter. Further, a cup-like 3 chamber forming member 21 is mounted on the side of the sealing chamber 8 of the bellows cap 7 and on the inner side of the bellows 6 by engaging, bonding or welding. This chamber forming member 21 forms a chamber room 22 having a predetermined capacity for damping a sound generated by the pulsating waves. The through hole-like throttling mechanism 20 is provided in the center of the flat face of the bellows cap 7 such that it opposes the fluid inlet 14. The chamber room 22 communicates with the fluid-fauw chamber 9 through the throttling mechanism 20. The bellows cap has a stepped engaging portion 7*b* for positioning the chamber forming member 21 in the center of the flat face.

The accumulator 1 having the aforementioned structure accumulates and discharges the pressure of oil in the system as a pressure accumulating apparatus and the following operation and effect are exerted with the aforementioned structure.

That is, there is a fear that the pulsating wave is generated when the pressure of oil is accumulated or discharged, thereby generating a sound (abnormal sound). If fluid with the pulsating wave flows into the fluid flow-in chamber 9 through the fluid inlet 14 in the accumulator 1 having the above-described structure, pulsating wave energy is converted to loss energy due to contracted flow and throttling by the through hole-like throttling mechanism 20 and used as loss of dynamic pressure by the chamber room 22. Thus, the pulsating wave can be damped and consequently, a sound generated by the pulsating wave can be damped. The abnormal sound preventing mechanism comprised of the throttling mechanism 20 and the chamber room 22 acts in a range from zero in system pressure to a gas sealing pressure.

The present invention exerts the following effects.

In the accumulator 1 of claim 1 having the above-described structure, if fluid with pulsating of the system side flows into the accumulator, the pulsating energy is converted to loss energy due to contracted flow and throttling by the throttling mechanism provided on the movable end portion of the operating member including the bellows and used as loss of dynamic pressure by the chamber room. Consequently, the pulsating can be damped so that a sound due to the pulsating wave can be damped. Therefore, an accumulator having an excellent silencing performance can be provided.

Further, in the accumulator of claim 2 of the present invention, if fluid with pulsating of the system side flows into the accumulator, the pulsating energy is converted to loss energy due to contracted flow and throttling by the throttling mechanism provided on the bellows cap mounted on the end portion of the bellows and used as loss of dynamic pressure by the chamber room. Consequently, the pulsating can be damped so that a sound due to the pulsating wave can be damped. Therefore, an accumulator having an excellent silencing performance can be provided. Additionally, in the accumulator according to claim 3 of the present invention, because the throttling mechanism is provided at a position opposing the fluid inlet, the throttling mechanism is likely to be actuated to fluid flowing through the fluid inlet. Even if the movable end of the operating member or the bellows cap approaches the fluid inlet, the operation for damping the pulsation can be exerted.

DESCRIPTION OF REFERENCE NUMERALS

1: accumulator
2: housing
3: shell
4: end cover
5: operating member
6: bellows
7: bellows cap
8: pressure sealing chamber
9: fluid flow-in chamber
10: pressure supplying port
11: plug member
12: mounting portion
13: thread portion
14: flow inlet
15: sliding member
16, 18: seal
17, 19: holder
20: throttling mechanism
21: chamber forming member
22: chamber room

What is claimed is:

1. An accumulator wherein an operating member containing a bellows is disposed inside a housing so as to divide the interior of the housing to a pressure sealing chamber and a fluid flow-in chamber and the housing is provided with a fluid inlet for introducing fluid to the fluid flow-in chamber from the side of a fluid pipe, the accumulator further comprising a throttling mechanism and a chamber room for damping a sound generated by the pulsating wave, provided at a movable end portion of the operating member, wherein fluid cannot flow from the chamber room and fluid flow-in chamber into the pressure sealing chamber.

2. The accumulator as claimed in claim 1 wherein the operating member has a bellows cap to be attached to the movable end portion of the bellows, and the bellows cap contains the throttling mechanism and the chamber room.

3. The accumulator as claimed in claim 1 or 2 wherein the throttling mechanism is provided at a position opposing the fluid inlet.

* * * * *